US009394127B2

(12) United States Patent
Manor et al.

(10) Patent No.: US 9,394,127 B2
(45) Date of Patent: Jul. 19, 2016

(54) SELF-ALIGNING LOW PROFILE SPRING-BIASED MEDIA FEED ROLL ASSEMBLY FOR AN IMAGING DEVICE

(71) Applicant: Lexmark International, Inc., Lexington, KY (US)

(72) Inventors: Adam Thomas Manor, Lexington, KY (US); Daniel George Mlejnek, Nicholasville, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/472,552

(22) Filed: Aug. 29, 2014

(65) Prior Publication Data
US 2016/0083208 A1 Mar. 24, 2016

(51) Int. Cl.
*B65H 5/06* (2006.01)
*F16M 13/02* (2006.01)

(52) U.S. Cl.
CPC ............... *B65H 5/062* (2013.01); *F16M 13/02* (2013.01); *B65H 2402/545* (2013.01); *B65H 2404/144* (2013.01)

(58) Field of Classification Search
CPC .......... B65H 5/062; B65H 5/068; B65H 5/06; B65H 2402/545; B65H 2404/144
See application file for complete search history.

(56) References Cited

U.S. PATENT DOCUMENTS

| 6,857,631 | B2 * | 2/2005 | Morrison | B65H 5/06 267/155 |
| 2014/0306396 | A1 * | 10/2014 | Lan | B65H 5/06 271/3.19 |

FOREIGN PATENT DOCUMENTS

| JP | 04159941 A | * | 6/1992 |
| JP | 07002386 A | * | 1/1995 |
| JP | 2008058448 A | * | 3/2008 |

* cited by examiner

*Primary Examiner* — Luis A Gonzalez
(74) *Attorney, Agent, or Firm* — John Victor Pezdek

(57) ABSTRACT

A low profile, alignment assembly for a media feed roll assembly using torsion spring biasing. The alignment assembly has a first and a second spaced bushings mountable to a frame. Each bushing has a circular collar and a cradle positioned along a common centerline for rotatably holding a driven first and an opposed second shaft on the common centerline. A first and a second torsion spring mount around the second shaft adjacent to the first and second bushing, respectively, and each has a pair of legs extending tangentially therefrom, attachable to the frame or respective bushing and forming a substantially planar profile. Each torsion spring biases the second shaft toward the first shaft along the common centerline and, as a media sheet moves between the first and second shafts, allows the second shaft to move within the cradles radially away from the first shaft along the common centerline.

21 Claims, 10 Drawing Sheets

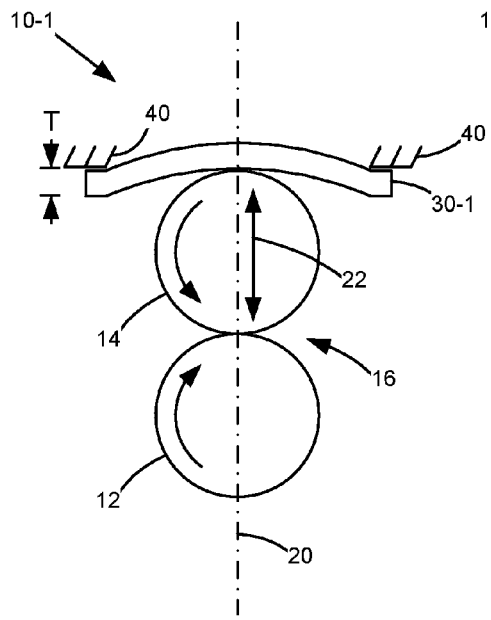
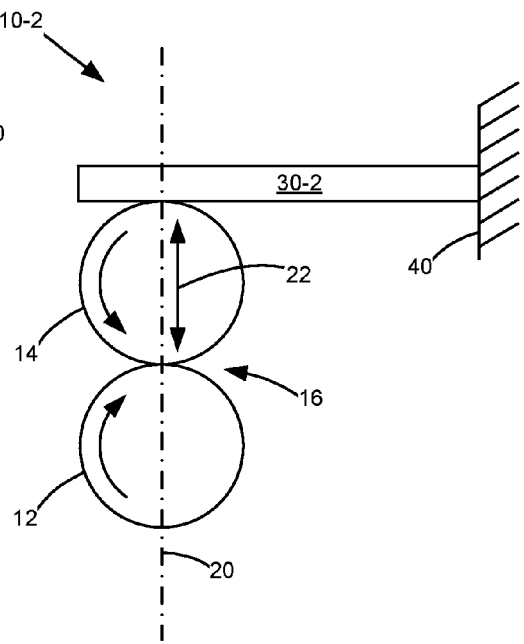
Figure 1A
Prior Art
Figure 1B
Prior Art
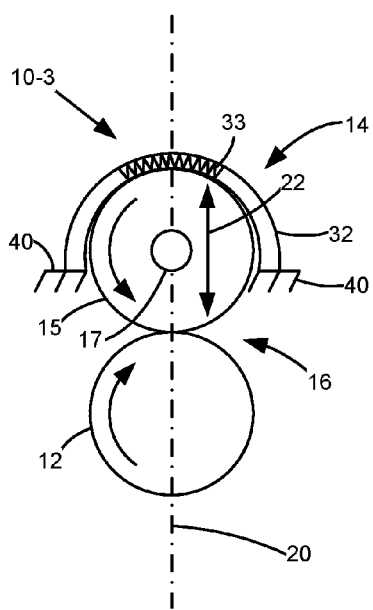
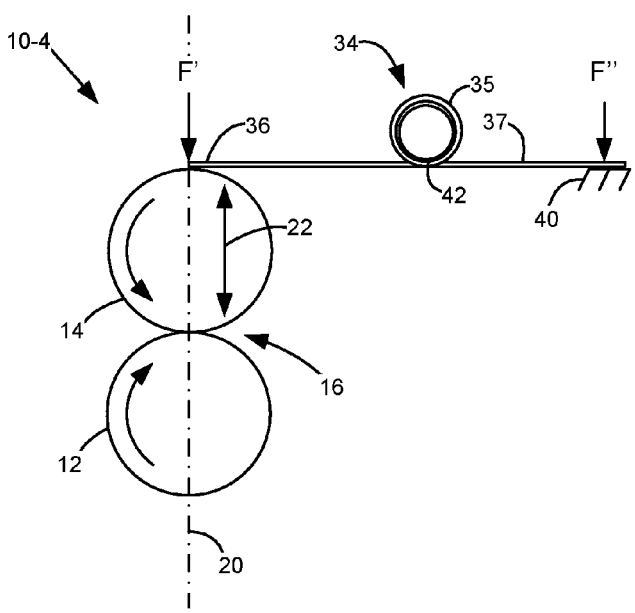
Figure 1C
Prior Art
Figure 1D
Prior Art

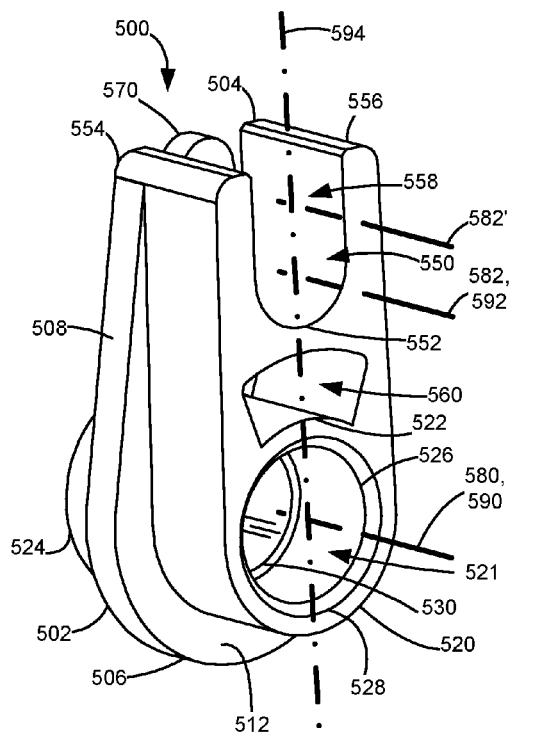
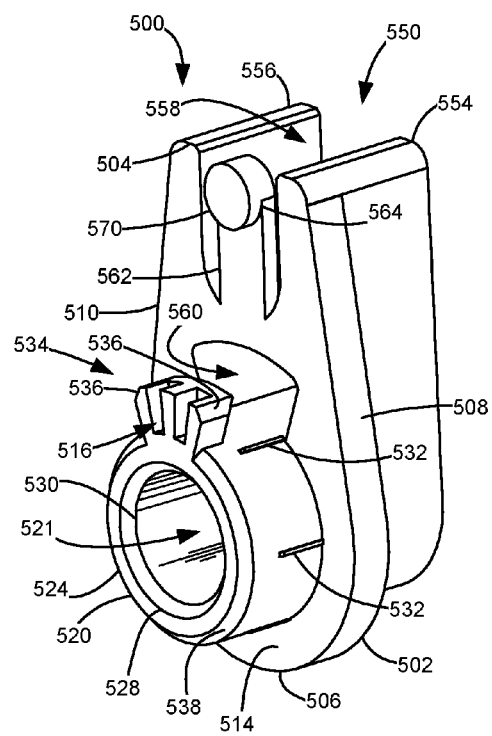
Figure 4A
Figure 4B
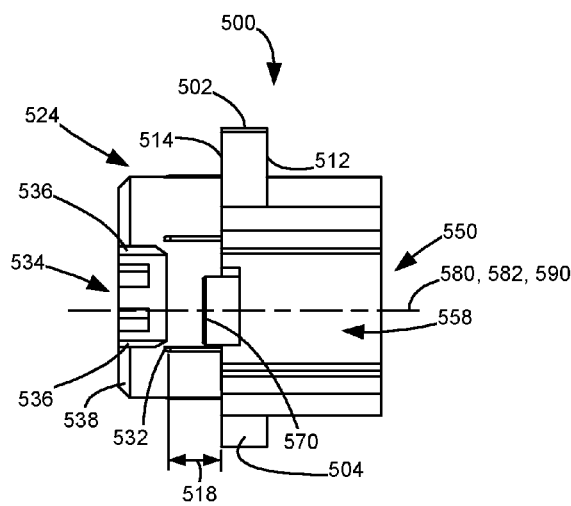
Figure 4C

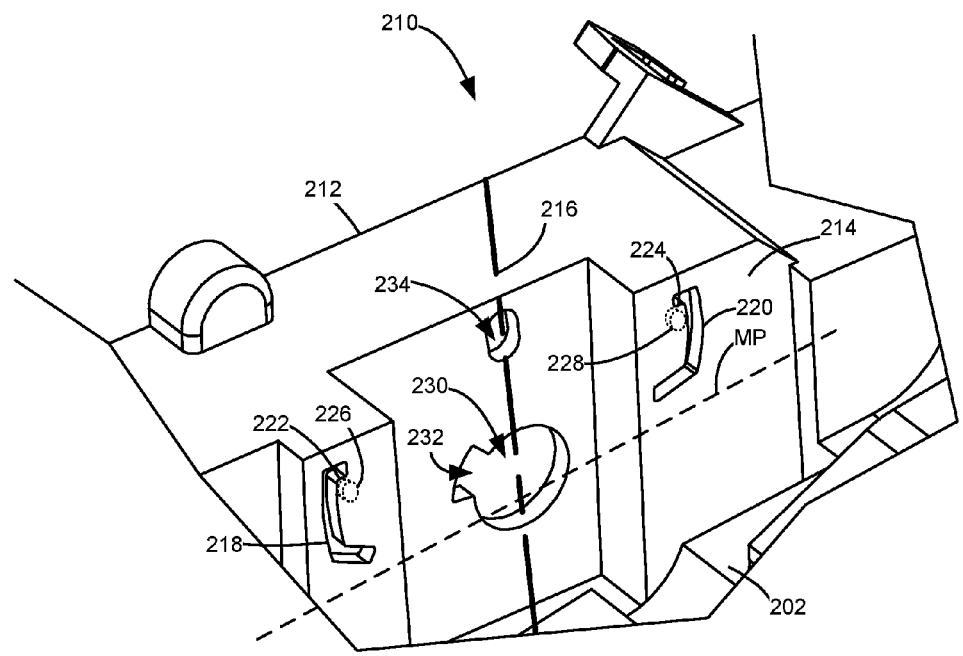
Figure 5
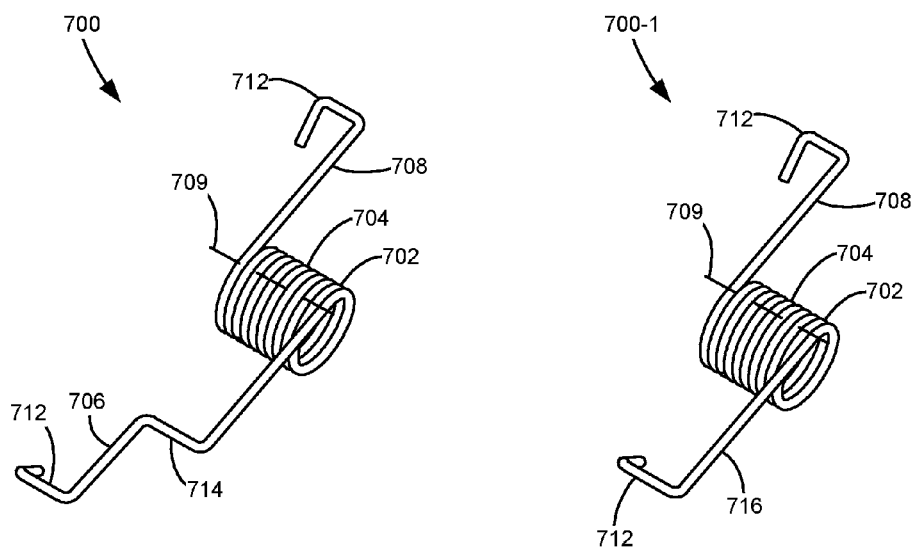
Figure 6A
Figure 6B

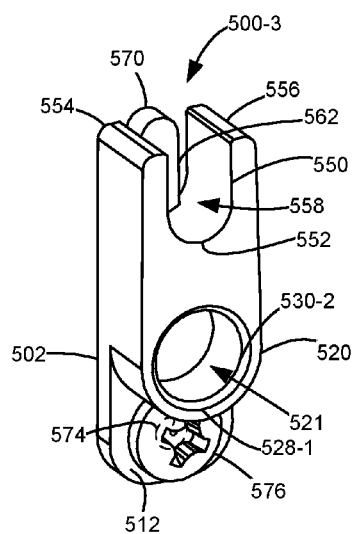
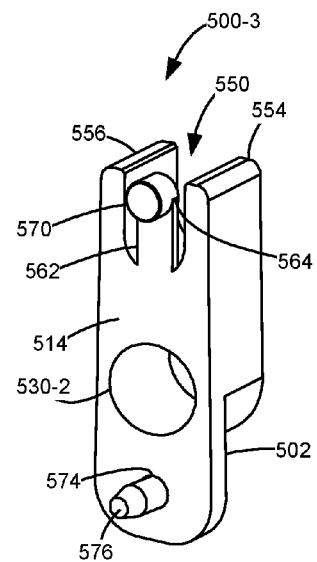
Figure 13A
Figure 13B
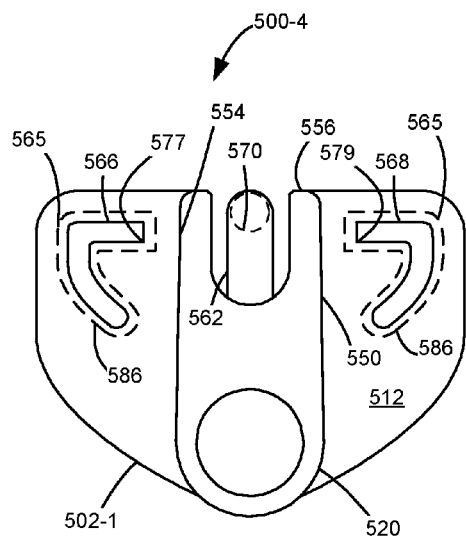
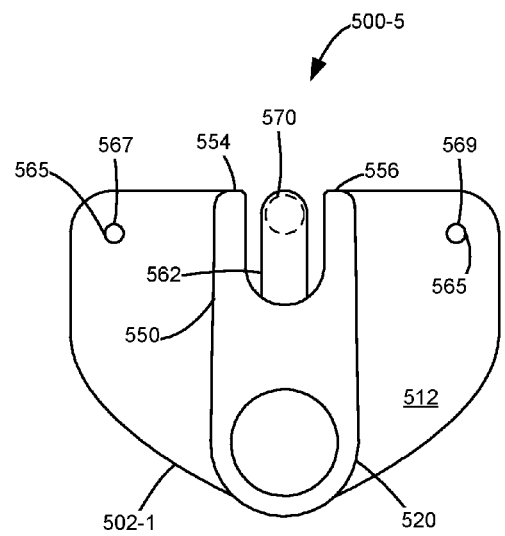
Figure 14
Figure 15

SELF-ALIGNING LOW PROFILE SPRING-BIASED MEDIA FEED ROLL ASSEMBLY FOR AN IMAGING DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to imaging devices, and more particularly to a media feed roll assembly for an imaging device.

2. Description of the Related Art

Media feed roll assemblies move sheets of media along a media feed path extending between a media input location, such as a media input tray or multipurpose tray, to a media output location in an imaging device. In such assemblies, shafts are mounted parallel to each other within a frame of the assembly and mount one or more opposed rolls forming a feed nip therebetween for feeding a media sheet. During media feeding, unwanted skew of a media sheet may occur due to varying nip pressure or shaft misalignment or skew.

A prior art media feed roll assembly 10-1 is shown in FIG. 1A. Assembly 10-1 includes opposed driven roll 12 and idler roll 14 forming a nip 16 and having respective rotational centers aligned along a common centerline 20. A leaf spring 30-1 is mounted between frame supports 40 and provides a biasing force to idler roll 14 along common centerline 20. The amount of biasing force applied to idler roll 14 is proportional to the cube of the thickness T of leaf spring 30-1. The biasing force applied to idler roll 14 is exerted on driven roll 12 or on the media sheet while it passes through nip 16. The idler roll 14 moves up and down as indicated by arrow 22, i.e. into and out of contact with, the driven feed roll 12 whenever the media sheet passes through the nip 16.

Another prior art assembly 10-2 is shown in FIG. 1B again having driven roll 12 and idler roll 14 forming nip 16, both being positioned along common centerline 20. Here, leaf spring 30-2 is mounted in a cantilever arrangement having one end affixed to support 40 while the free end thereof contacts idler roll 14 to bias it toward driven roll 12 generally along common centerline 20. In the prior art designs of FIGS. 1A-1B, idler roll 14 is prone to misalignment from common centerline 20 because each component (e.g., driven roll 12) along the length of its drive shaft has part tolerances that affect idler roll 14 as it is biased toward driven roll 12. Alignment control of the driven roll 12 and idler roll 14 is further affected as additional bushings are used to mount the shaft(s). Accounting for such tolerance stack-ups and having controllable and predictable force application are desired for proper alignment of the two opposed rolls.

With increasing need to reduce the size of imaging devices, the space for the media path and the media feed roll assemblies is preferably reduced. In turn, space to place biasing features, such as the leaf springs and torsion springs, is reduced. Likewise, any increased functionality provided in an imaging device may use the space that once provided biasing support features. Also, while leaf springs are used to help reduce the space needed for loading features their use introduces variability in the characteristics of the spring due to variations in the thickness T of such leaf springs from part to part. The biasing force for a given leaf spring is proportional to the cube of its thickness T. As would be appreciated, a small variation in the thickness creates a much larger variation in the spring force.

In order to address part to part variations when loading the idler shaft, a more recent assembly 10-3 shown in FIG. 1C uses an extension spring 32 wrapped partially around a bushing 15 on idler shaft 17 of idler roll 14. The ends of the extension spring 32 are fixed to mounts 40. However, as idler roll 14 moves during media feeding and extension spring 32 stretches around bushing 15, friction between spring coils 33 and bushing 15 prevents some of the spring coils 33 from moving, resulting in force variations and unbalanced pressures along the length of nip 16. Also, over time, the friction between extension spring 32 and bushing 15 changes, resulting in further variation of the nip pressure. Another prior art design uses a spring extended between the two shafts that is hooked onto a bushing supporting the shafts. However, the narrow space therebetween forces the spring to have a small number of coils and heavy gage wire. This produces a large spring rate resulting in an unstable and unpredictable nip loading.

A further prior art assembly 10-4 shown in FIG. 1D uses a torsion spring 34 to bias idler roll 14. The body 35 of torsion spring 34 is mounted to a cantilever post 42 positioned to the side of idler roll 14. A first leg 36 of torsion spring 34 engages idler roll 14 and a second leg 37 engages the support 40. Two drawbacks with this arrangement are the amount of space needed to mount torsion spring 34 and the strength required for post 42 on an imaging device frame to withstand the spring forces, such as F' and F'', involved. Typically, support 40 and the frame on which post 42 is mounted are made of plastic which requires that both be reinforced to withstand the forces involved. In still another prior art design, a class 2 lever is positioned in the same manner as torsion spring 34 but extends beyond idler roll 14 to provide a fulcrum on one end at support 40 and a resistance in the middle for biasing the idler roll 14. However, a mechanism to produce effort on the other end of the lever uses additional parts and requires more space, thereby requiring a higher profile than the previous spring arrangements shown.

It would be advantageous to employ a biasing spring in a media feed roll assembly where part to part variation is minimized. It would be further advantageous to have an alignment and biasing assembly that provides a low profile and which minimizes space requirements within the imaging device. It would be still further advantageous to have a spring mounting arrangement that does not require an additional mounting post.

SUMMARY

Disclosed is an alignment assembly for axially aligning and rotatably holding a first shaft and a second shaft. The shafts form a nip therebetween for feeding a media sheet. The first shaft is coupleable to a drive source. A first and a second bushing are mountable to a frame of a media feed roll assembly in a spaced relationship. Each bushing has a circular collar and a cradle that are positioned along a common centerline for receiving and rotatably holding respective centers of the first and the second shafts on the common centerline. A first and a second torsion spring are mounted around the second shaft adjacent to the first and second bushing, respectively. Each torsion spring has a pair of legs extending therefrom and attachable to the frame or the respective bushing. With the bushings attached to the frame and the pairs of legs of each torsion spring attached to the frame or the respective bushings, each pair of legs forms a substantially planar profile and biases the second shaft toward the first shaft along the common centerline while allowing the second shaft to move within the cradles radially away from the first shaft along the common centerline as the media sheet moves through the nip.

In another form, the frame includes a first arm and an opposed second arm. Each arm includes a first opening therein, a second opening aligned with the first opening along a first centerline, and a pair of opposed mounts positioned above the first opening. A first and a second bushing are mounted to the first and second arms, respectively. Each bushing includes a plate and a cylindrical collar having a front and a rear portion axially extending from a front and a rear surface of the plate, respectively. The rear portion of the collar is sized to be closely received in a corresponding first opening of the respective arm of the frame. At least the front portion of the collar has an axial opening therein. Each bushing also includes a cradle disposed above the collar and axially extending from the front surface of the plate. The collar and corresponding cradle are centered along a second centerline and rotatably hold the first and second shafts, respectively, along the second centerline. A rotational stop axially extends from the rear surface of the plate and is centered along the second centerline. Also, the rotational stop is sized to be closely received in a corresponding second opening of the respective arm of the frame. With the rear portion of the collar received in the respective first opening and the corresponding rotational stop received in the respective second opening, the first and second centerlines are coincident and form a common centerline. A first and a second torsion spring are axially spaced on the second shaft adjacent to the first and second bushings, respectively. Each torsion spring has a coiled body having a pair of legs extending therefrom. The second shaft passes through each coiled body. Each leg has a catch engaged with a corresponding latching surface of a corresponding mount provided on the plate of corresponding bushing or on the corresponding arm, forming a substantially planar profile and biasing the second shaft along the common centerline toward and into axial contact with the first shaft. As the media sheet moves through the nip, the second shaft moves within the cradles of the bushings radially away from the first shaft along the common centerline.

In a further form, each first opening of the frame has a keyway radially displaced from the first centerline. The rear portion of each collar has a corresponding radial flange sized to pass through the keyway. The flange is spaced apart at a distance from the rear surface of the bushing plate such that the corresponding arm of the frame is sandwiched between the flange and the rear surface, thereby preventing axial movement of the first and second bushings when attached to the corresponding first and second arms of the frame. Each collar also has a plurality of radially extending crush ribs spaced around an outer periphery of the rear portion. The insertion of the rear portions into a respective opening in the first pair of axially aligned openings crushes the crush ribs. The axial opening of each collar includes a bearing portion having a first diameter sized to closely receive and rotatably support the first shaft. The axial opening includes an entry portion having a second diameter greater than the first diameter. The rotational stop when inserted into the corresponding second opening provides a rotational tolerance between the corresponding frame arm and bushing attached thereto. With respect to the substantially planar profile of each pair of legs, the torsion springs each have a range of rotation from a free to a loaded state and an angular tolerance between each leg. With each leg of the torsion springs attached to the frame or the respective bushing, each torsion spring provides a force vector to the second shaft in a direction aligned with the respective common centerline at a particular range of biasing force and transverse to the media path. Each torsion spring also has a rotational spring rate at a particular range. Each coiled body of the torsion springs has an inner diameter substantially equal to a sum of a positive tolerance value and an outer diameter of a portion of the second shaft where the coiled body is wrapped.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

FIGS. 1A-1D are schematic views of prior art media feed roll assemblies.

FIGS. 4A and 4B are front and rear perspective views and FIG. 4C is a top view of a bushing of the alignment assembly of FIG. 2.

FIG. 5 is a partial side perspective view of a frame arm of the media feed roll assembly of FIG. 2 according to one example embodiment.

FIGS. 6A and 6B are perspective views of a torsion spring of the alignment assembly of FIG. 2 according to two example embodiments.

FIGS. 13A and 13B are front and rear perspective views of a bushing according to still another example embodiment.

FIG. 14 is a front perspective view of a bushing with an extended plate showing one form of spring attachment.

FIG. 15 is a front perspective view of a bushing with an extended plate showing another form of spring attachment.

DETAILED DESCRIPTION

Figure 2:
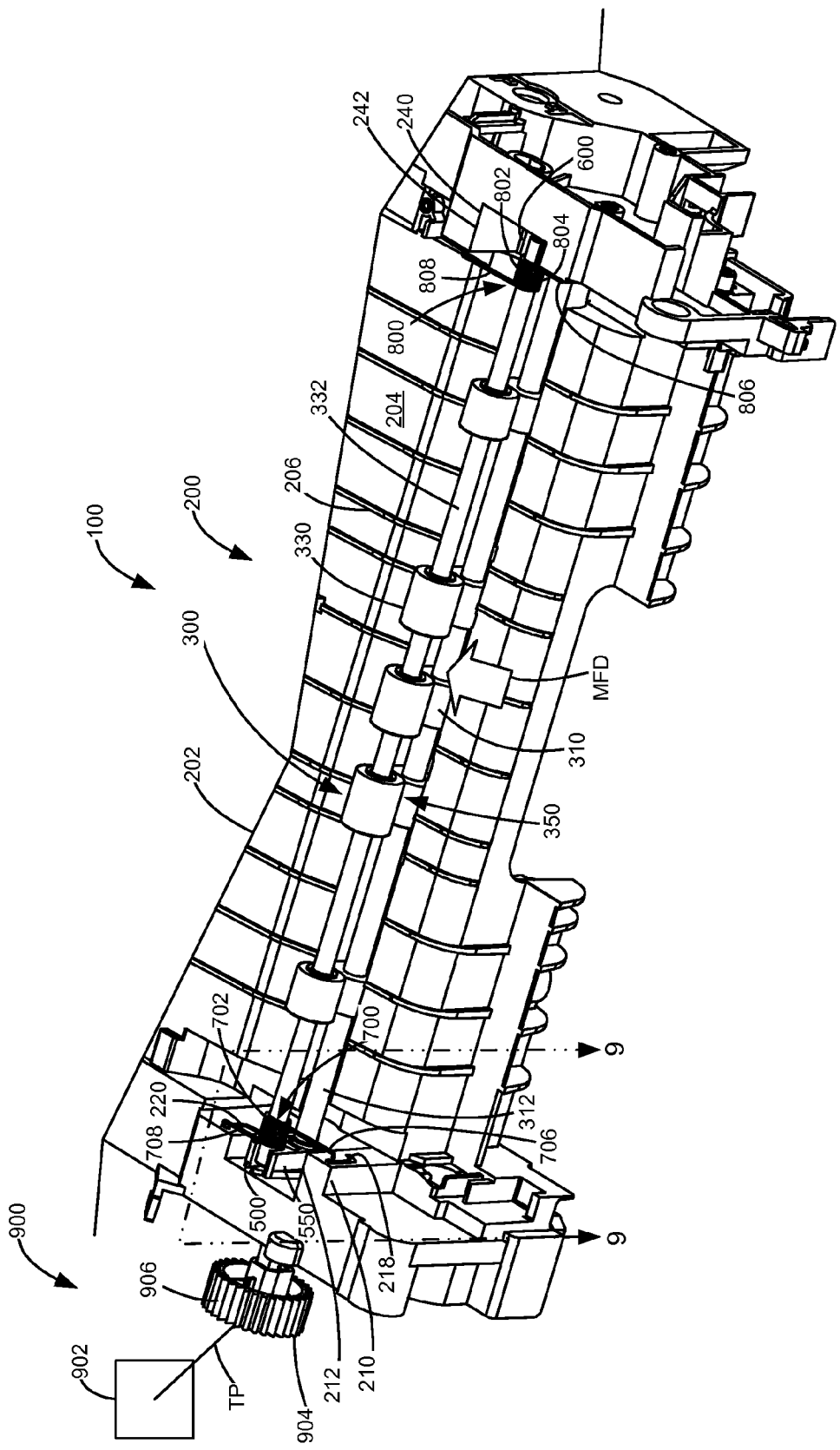
FIG. 2 is a partial perspective illustration of a media feed roll assembly with an alignment assembly according to one example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "left", "right", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

In addition, it should be understood that embodiments of the present disclosure may include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to present example embodiments of the present disclosure and that other alternative mechanical configurations are possible.

The term "output" as used herein encompasses output from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats.

The term "image" as used herein encompasses any printed or electronic form of text, graphics, or a combination thereof. "Media", "media sheet" or "sheet of media" refers to a material that receives a printed image or, with a document to be scanned, a material containing a printed image. The media is said to move along the media path and any media path extensions from an upstream location to a downstream location as it moves from the media trays or media input areas to the output area of the imaging device. For a top feed option tray, the top of the option tray is downstream from the bottom of the option tray. Conversely, for a bottom feed option tray the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the media path. The term "media length" refers to the dimension of the media that is aligned with the media path. "Media process direction" or "media feed direction" describes the movement of media within the imaging system and is generally meant to be from an upstream location such as an input tray toward a downstream location such as an imaging unit of the imaging system. For a duplex path, the media process direction is generally from a position downstream of the print engine to a position upstream of the print engine. Further relative positional terms may be used herein. For example, "superior" means that an element is above another element. Conversely "inferior" means that an element is below or beneath another element.

Media is conveyed using pairs of aligned rolls forming feed nips. The term "nip" is used in the conventional sense to refer to the opening formed between two rolls that are located at about the same point in the media path. The rolls forming the nip may be separated apart, be tangent to each other, or form an interference fit with one another. With this nip type, the axes of the rolls are parallel to one another and are typically, but do not have to be, transverse to the media path. For example, a deskewing nip may be at an acute angle to the media feed path. The term "separated nip" refers to a nip formed between two rolls that are located at different points along the media path and have no common point of tangency with the media path. Again the axes of rotation of the rolls having a separated nip are parallel but are offset from one another along the media path. Nip gap refers to the space between two rolls. Nip gaps may be positive, where there is an opening between the two rolls, zero where the two rolls are tangentially touching or negative where there is an interference fit between the two rolls.

As used herein, the term "communication link" or the term "transmission link" is used to generally refer to a structure that facilitates electronic communication between multiple components. Accordingly, a communication or transmission link may be a direct mechanical connection, an indirectly coupled mechanical connection, a direct electrical wired connection, a direct wireless connection (e.g., infrared or r.f.), or a network connection (wired or wireless), such as, for example, an Ethernet local area network (LAN) or a wireless networking standard, such as IEEE 802.11.

Referring now to the drawings and particularly to FIG. 2, there is shown a depiction of a media feed roll assembly 100 of an imaging device according to one example embodiment. Generally, media feed roll assembly 100 feeds media sheets along a media path of the imaging device. In the example embodiment of FIG. 2, media feed roll assembly 100 includes a frame 200 mountable to a housing of the imaging device. In this example embodiment, with frame 200 mounted to the imaging device, frame 200 extends across a portion of the media path.

It is appreciated that the media is fed in a media feed direction (MFD) along the media path extending from one or more input locations such as, for example, a removable media input tray, extending through a print engine to one or more output locations such as a media output area, a duplexer or a finisher. Moreover, the media path may include a multipurpose input tray provided on the housing and/or incorporated into the removable media input tray provided in the housing and a corresponding path branch that merges with the media path within the imaging device.

In the example embodiment shown in FIG. 2, frame 200 includes a base 202 and aligned, opposed arms 210, 240 supported on base 202. In this embodiment, media feed roll assembly 100 includes at least one opposed roll pair 300 mounted across frame 200 between opposed arms 210 and 240. Opposed roll pair 300 comprises a first or driven roll 310 and a second or idler roll 330 forming a feed nip 350 therebetween. In one form, base 202 may have a media guide surface 204 having a plurality of ribs 206 therealong that extend in the media feed direction (MFD) to support a sheet of media being fed into and out of opposed roll pair 300 along the MFD. As illustrated by the broad arrow, the MFD is shown as being in a direction from the bottom left of the page as viewed in FIG. 2 through opposed roll pair 300 into the top right of the page. As shown in this example embodiment, opposed arms 210, 240 of frame 200 are spaced from each other in a direction substantially perpendicular to the MFD. Opposed roll pair 300 is rotatable to feed media sheets along base 202 in the MFD.

In the example embodiment of FIG. 2, arm 210 includes spaced apart slots 218, 220 formed therein adjacent to ends of opposed roll pair 300 which are proximal to a free end 212 of arm 210. In this example embodiment, slots 218, 220 are formed on arm 210 at a position upstream and a position downstream of opposed roll pair 300, respectively, along the MFD. Slots 218, 220 receive the ends of legs 706, 708 of a torsion spring 700 mounted on arm 210. As shown in FIG. 2, slots 218, 220 are substantially C-shaped and face arm 240. Arm 240 includes two spaced apart slots therein similarly positioned proximal to a free end 242 of arm 240. These slots are obscured by the body of arm 240 and are similarly shaped to slots 218, 220. Similarly these two slots receive the ends of legs 806, 808, respectively, of a torsion spring 800. In one example embodiment, slots 218, 220 in arm 210 and those in arm 240 may have different shapes or have a different position in their respective arm. The frame 200, including its opposed arms 210, 240, may be made from a plurality of materials, or from a single plastic or metal material to support opposed roll pair 300, for example.

Figure 3:
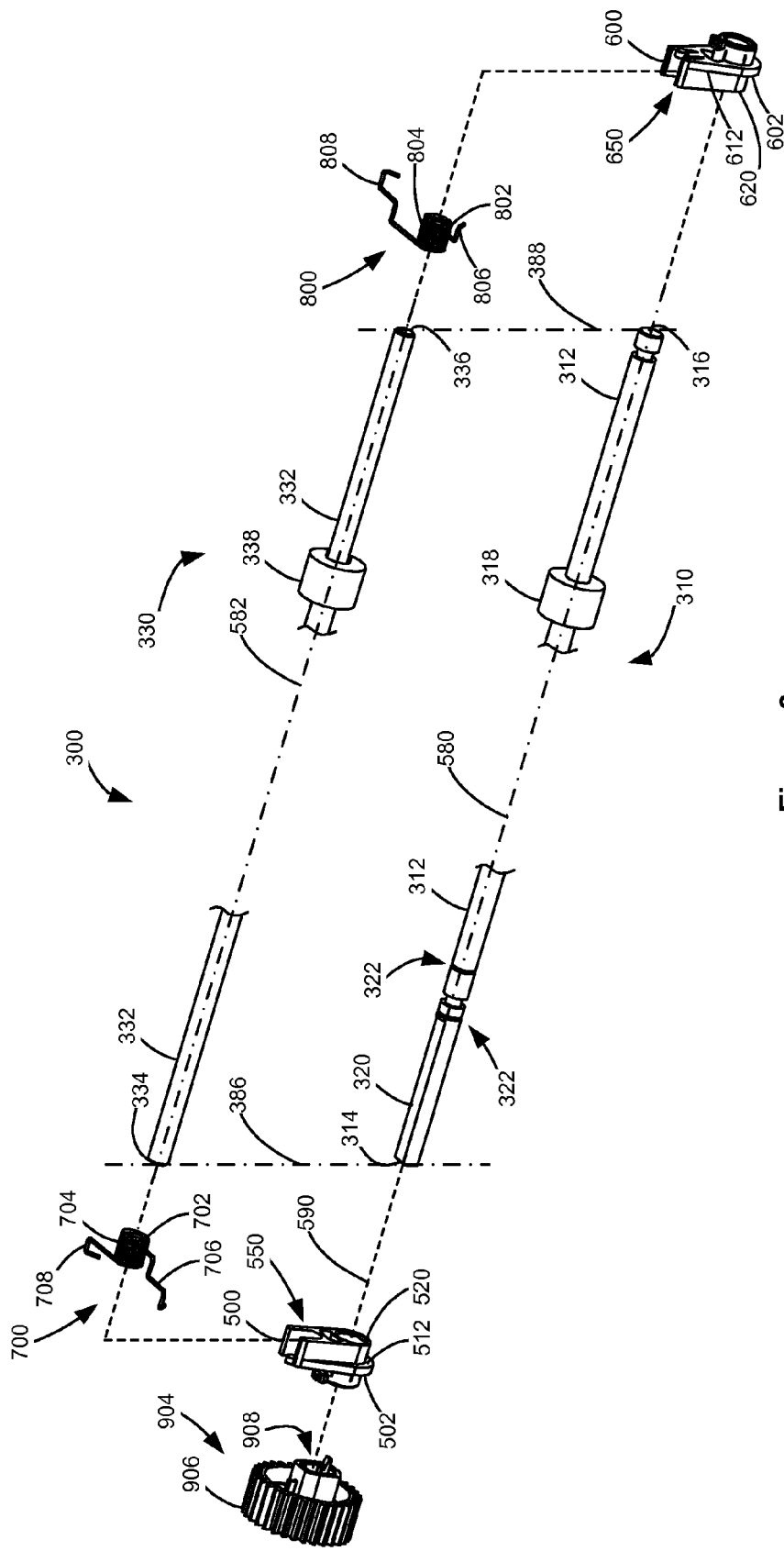
FIG. 3 is an exploded view of one form of the present alignment assembly shown in FIG. 2.

With reference to FIGS. 2 and 3, driven roll 310 includes a drive shaft 312 mounting one or more rolls 318. Also, idler roll 330 includes an idler shaft 332 on which is mounted one or more rolls 338 (see FIG. 3). In this example embodiment, rolls 318, 338 are rotatable with shafts 312, 332, respectively. Also, the feed nip 350 is formed between opposed rolls 318 and 338 of driven roll 310 and idler roll 330, respectively, for feeding the sheet of media.

With further reference to FIGS. 2 and 3, media feed roll assembly 100 includes bushings 500, 600 that are mounted to arms 210, 240 of frame 200, respectively. Bushings 500, 600 rotatably support respective ends of opposed roll pair 300 which is now described in further detail. As shown in FIG. 3, drive shaft 312 has opposed ends 314, 316 that are received in collars 520, 620 of bushings 500, 600, respectively, and are rotatably supported therein when bushings 500, 600 are mounted. When mounted, the center of drive shaft 312 is coincident with the center of collar 520. Similarly, idler shaft 332 has opposed ends 334, 336 that are received and mounted in cradles 550, 650 of bushings 500, 600, respectively, and are rotatably supported therein. As shown in FIG. 2, with idler shaft 332 mounted in cradles 550, 650, the driven and idler rolls 310, 330 are substantially parallel to each other and axially aligned. As shown in FIG. 3, the centers of ends 314, 334 and the centers of ends 316, 336 of driven and idler rolls 310, 330 lie on respective centerlines 386, 388 which in turn will be coincident with respective centerlines of bushings 500, 600, forming a common centerline (each later described in detail) when driven and idler rolls 310, 330 are installed in bushings 500, 600. The axial rotational centerlines of driven roll 310 is indicated at 580 while that of idler roll 330 is indicated at 582 and intersects with centerlines 386, 388 when driven and idler rolls 310, 330 are installed in frame 200, aligning the two rolls 310, 330.

With reference still to FIG. 3, drive shaft 312 includes one or more slots 322 for receiving one or more e-clips (see FIG. 9) within collar 520 of bushing 500 so as to secure drive shaft 312 in collars 520. In the example embodiment shown, slots 322 are spaced from each other and formed circumferentially on an outer surface of drive shaft 312 near shaft end 314. With drive shaft 312 mounted through bushing 500 and the e-clips installed in slots 322, drive shaft 312 is secured to arm 210 and bushing 500 to substantially eliminate axial movement of drive shaft 312. In one embodiment, slots 322 and the e-clips may be provided adjacent shaft end 316 for engaging with collar 620.

In the embodiment shown in FIG. 2, a drive assembly 900 is provided in the imaging device. In the example embodiment shown, drive assembly 900 is mounted adjacent arm 210 of frame 200. As shown in FIGS. 2 and 3, drive assembly 900 includes a motor 902 and a transmission path TP coupled to motor 902 and a gear 904. In particular, motor 902 rotates gear 904 via transmission path TP. Gear 904 is operably coupled to drive shaft 312. Gear 904 includes teeth 906 for engaging and rotating with motor 902 and/or with one or more gears coupled to motor 902 via transmission path TP. As illustrated in FIG. 3, gear 904 is operably coupled to drive shaft 312 using a D-shaped center opening 908 therein that is sized to closely receive end 314 of drive shaft 312 having a flat 324 provided thereon. With gear 904 and drive shaft 312 operably coupled, motor 902 when energized rotates drive shaft 312 and thereby feeds sheets of media. The driven and idler rolls 310, 330 axially rotate when motor 902 is running to feed a sheet of media through feed nip 350 in the MFD.

Bushings 500, 600 are made of material that supports respective ends of the two shafts 312, 332. In one example embodiment, the material used for bushings 500, 600 is polyoxymethylene (POM) polymer, also known as acetal, polyacetal and polyformaldehyde. POM is produced by different chemical manufacturers and sold variously under such tradenames as DELRIN®, CELCON®, DURACON® and HOSTAFORM®. In another example embodiment, bushings 500, 600 are made from a plurality of materials, or a single plastic or metal material for mounting opposed roll pair 300.

As shown in FIG. 3, bushings 500, 600 include plates 502, 602, the collars 520, 620 and the cradles 550, 650, respectively. Collars 520, 620, and cradles 550, 650 axially extend from at least respective front surfaces 512, 612 of plates 502, 602. For example, at least a portion of collars 520, 620 are disposed on front surfaces 512, 612, respectively. As illustrated, cradles 550, 650 are positioned above respective collars 520, 620 with bushings 500, 600 mounted to frame 200. It would be understood by one of ordinary skill in the art that the mounting orientation of media feed roll assembly 100 should not be considered as a limitation and may vary so that in one orientation, cradles 550, 650 may be positioned aligned with and below respective collars 520, 620 with bushings 500, 600 mounted while in another orientation cradles 550, 650 are aligned horizontally with respect to respective collars 520, 620.

With reference to FIGS. 2 and 3, media feed roll assembly 100 includes the torsion springs 700, 800 that mount to one of frame 200 and respective bushing 500, 600. As shown, torsion spring 700 includes a body 702 having one or more coils 704, and legs 706, 708 extending from opposite ends of body 702. Similarly, torsion spring 800 includes a body 802 having one or more coils 804, and legs 806, 808 extending from each end of body 802. Legs 706, 708 and legs 806, 808 are shown extending in common tangent planes from bodies 702, 802, respectively.

Bodies 702, 802 of torsion springs 700, 800 each wrap around idler shaft 332 adjacent to ends 334, 336 respectively. This allows the overall height of media feed roll assembly 100 to be reduced as compared to previously discussed prior art designs. In particular, coils 704, 804 are mounted around idler shaft 332 adjacent to bushings 500, 600, respectively. In the example embodiment of FIG. 2, the torsion springs 700, 800 are also operably coupled to corresponding arms 210, 240 of frame 200. In particular, legs 706, 708 of torsion spring 700, respectively, are attached to the corresponding arm 210 via slots 218, 220 of arm 210 while legs 806, 808 are similarly attached to correspondingly provided slots in arm 240. In another example embodiment, legs 706, 708 and 806, 808 are attached to bushings 500, 600 instead, as described later.

In each of these embodiments, torsion springs 700, 800 bias idler roll 330 in cradles 550, 650 toward driven roll 310. As will be later described in detail, a spring force vector F is applied to idler roll 330 by torsion springs 700, 800. Spring force vector F is directed substantially perpendicular to the media path through nip 350 of opposed roll pair 300 along the MFD. Torsion springs 700, 800 allow radial movement of idler roll 330 away from driven roll 310 to accommodate the media sheet being fed and to also allow for removal of a jammed media sheet. In addition, due in part to torsion springs 700, 800 biasing idler roll 330, there is auto-alignment of idler roll 330 to driven roll 310 along the common centerline. Although idler roll 330 is illustrated as being spring biased and mounted in cradles 550, 650, it will be realized that idler roll 330 may be mounted in collars 520, 620 and driven roll 310 may be spring biased and mounted in cradles 550, 650. With this arrangement, the drive assembly 900 may further include a coupler, such as, but not limited to, an Oldham coupler, to allow for offset between driven roll 310 and drive assembly 900 to permit the radial movement of driven roll 310 while still being able to be rotated by drive assembly 900.

FIGS. 4A-4C illustrate bushings 500, 600 according to one example embodiment. Because both bushings 500, 600 are substantially identical, only bushing 500 will be described with only any difference between bushing 500 and bushing 600 being noted. In this example, embodiment, plate 502 includes a top 504, a bottom 506, a left side 508 and a right side 510 with respect to front surface 512 as viewed in FIG. 4A. As shown in both FIGS. 4A and 4B, plate 502 is substantially U-shaped. It is appreciated that other shapes of plate 502 may be used and the shape illustrated should not be construed to be a limitation.

As shown, collar 520 is disposed adjacent to bottom 506 and between left and right sides 508, 510. In this embodiment, collar 520 includes a front portion 522 and a rear portion 524 each axially extending from respective front surface 512 and rear surface 514 of plate 502. As described later in more detail, rear portion 524 of collar 520 engages with a corresponding opening in arm 210 of frame 200 when bushing 500 is mounted. Alternatively, collar 520 may only axially extend from front surface 512 of plate 502 and thereby form only front portion 522. For example, collar 520 may axially extend from front surface 512 of plate 502 but not protrude and/or exit from rear surface 514 of plate 502 as shown in latter bushing embodiments. In each embodiment shown, collar 520 is cylindrically shaped. It is also appreciated that other shapes for collar 520 may be used to engage with arm 210 such that the shape illustrated should not be construed to be a limitation.

Figure 9:
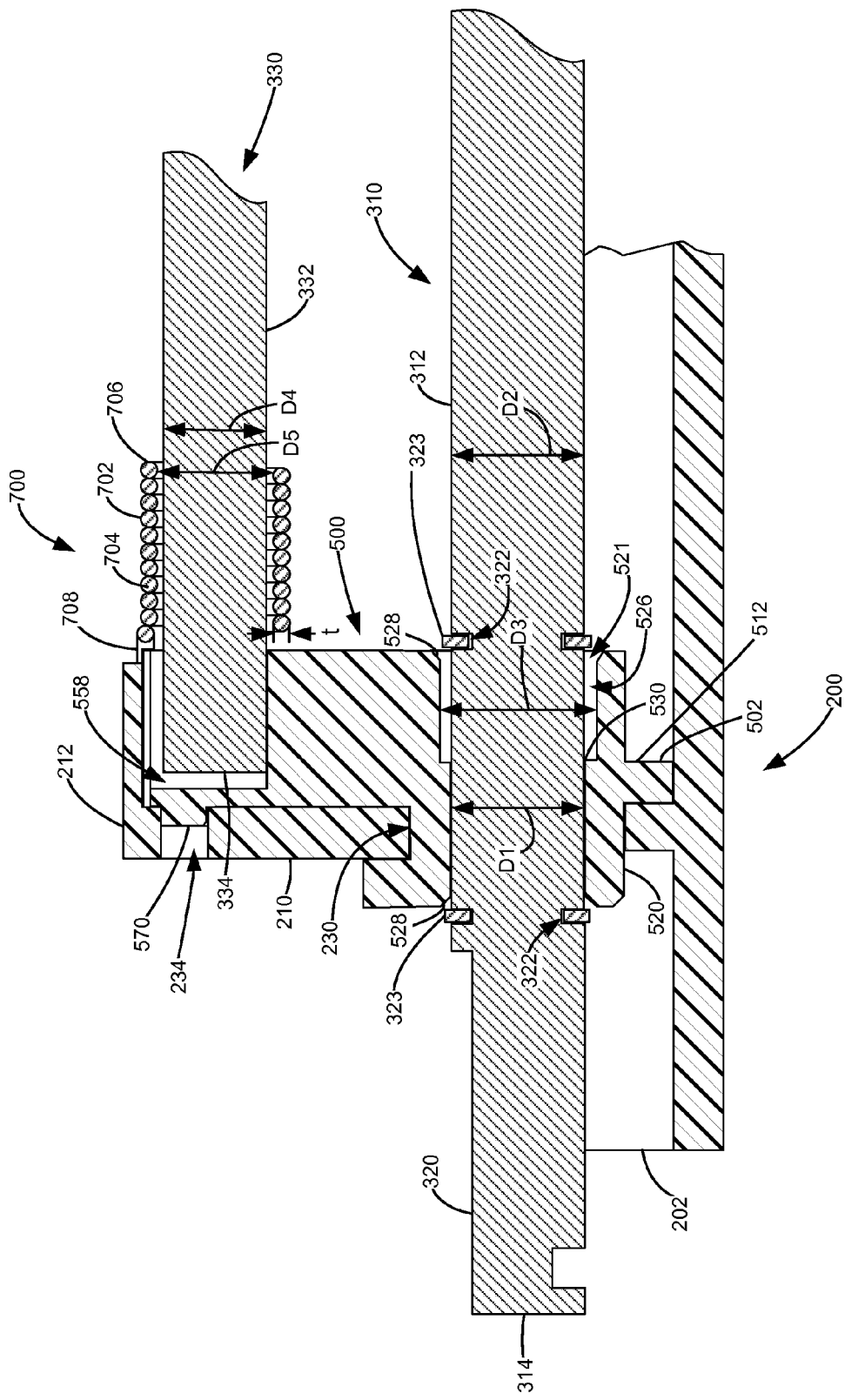
FIG. 9 is a partial sectional view taken along line 9-9 of FIG. 2 illustrating mounting of the alignment assembly according to one example embodiment.

With reference still to FIGS. 4A, 4B and 9, at least front portion 522 of collar 520 having an axial opening 521 therein to rotatably support drive shaft 312. In this example embodiment, the axial opening 521 includes an entry portion 526 and a bearing portion 530 axially extending a portion of the length of collar 520. As shown in FIG. 9, bearing portion 530 axially extends through rear portion 524 of collar 520. Bearing portion 530 has a first diameter D1 sized to closely receive and rotatably support drive shaft 312 having a diameter D2. Front portion 522 of collar 520 is illustrated as including entry portion 526 of the axial opening 521 that has a second diameter D3 greater than the first diameter D1 of bearing portion 530. In addition, interior front and rear chamfers 528 are disposed around an outer periphery of entry portion 526 and bearing portion 530, respectively, to ease insertion of drive shaft 312 into collar 520. In the example embodiments shown, the axial opening 521 is circular or cylindrical similar to collar 520.

As shown in FIGS. 4B and 4C, crush ribs 532 are disposed about the periphery of an outer surface of rear portion 524 of collar 520. In the embodiment shown, each of crush ribs 532 extend from a position adjacent to rear surface 514 of plate 502 toward an outer edge of rear portion 524. Crush ribs 532 are deformed when bushing 500 is mounted in a first opening 232 of arm 210 (see FIG. 9). Returning to FIGS. 4A and 4B, bushing 500 includes a hole 560 located substantially center of bushing 500 for molding purposes thereof. In this example embodiment, hole 560 axially extends through plate 502 to aid in the molding of bushing 500. Alternatively, bushing 500, 600 may have no hole and/or crush ribs thereon. It is appreciated that other forms of crush ribs 532 in collar rear portion 524 and hole 560 in bushing 500 may be used such that the illustrations herein should not be construed to be a limitation.

In the example embodiment shown in FIGS. 4A and 4C, cradle 550 axially extends from front surface 512 of plate 502. As illustrated, cradle 550 and collar 520 have substantially the same axial extension from front surface 512 but each may be of different axial lengths. Cradle 550 includes a base 552 having arms 554, 556 that extend upwardly therefrom, forming a slot or channel 558 therebetween. In addition, arms 554, 556 allow idler shaft 332 to be rotatably supported in base 552 while allowing for radial movement of idler roll 330 during media feeding. In the embodiment shown, cradle arms 552, 554 are substantially parallel to each other. In each of the example embodiments shown, for example in FIGS. 4A and 4B, the base 552 is substantially U-shaped. In another example embodiment, base 552 may have a V-shape. It is appreciated that the shape of base 552 is not limited provided that channel 558 has a width that is slightly wider than a diameter of idler shaft 332. This allows for slight motion of idler shaft 332 with base 552 of cradle 550 of bushing 500 as idler roll 330 is biased toward driven roll 310, thereby helping to provide auto-alignment.

In FIG. 4B, a latching arm 562 is formed in plate 502 between arms 554, 556 of cradle 550. In this example embodiment, latching arm 562 is aligned with rear surface 514 of plate 502 and forms a partial back to cradle 550. Latching arm 562 is illustrated as being about the same height as cradle arms 554, 556. A rotational stop 570 is disposed at a distal end 564 of latching arm 562. As shown, rotational stop 570 axially extends from the same plane as rear surface 514 of plate 502. Rotational stop 570 engages with a corresponding second opening 234 provided in arm 210 (see FIG. 9) so as to restrict rotation of bushing 500 once mounted. Latching arm 562 is flexible, allowing rotational stop 570 to snap into second opening 234 in arm 210.

Returning to FIGS. 3, 4A and 4C, axial centerline 580 of rotation of driven roll 310 are shown coincident with an axial centerline 590 of collar 520 when driven roll 310 is mounted in collar 520. Axial centerline 582 of rotation of idler roll 330 is shown coincident with an axial centerline 592 of U-shaped base 552 when idler roll is mounted in cradle 550 and no media is being fed. Both axial centerlines 580 582 intersect a common centerline 594 of collar 520 and cradle 550.

In other words, the centerline 386 between driven and idler rolls 310, 330 and centerline 594 of bushing 500 form a common centerline 718 (see FIG. 7) when driven and idler rolls 310, 330 are installed. As will be appreciated, idler roll 330 radially (vertically as shown) moves along centerline 594 during media feeding as indicated at 582' and when returning to its biased position when media is not present as indicated at 582 (see FIG. 4A). In each of these embodiments, the centers of collar 520 and cradle 550 is positioned along centerline 594 so as to be aligned with each other. Collar 520 and cradle 550 receive and rotatably hold respective centerlines 580, 582 of driven roll 310 and idler roll 330 on centerline 594. In addition a rotational stop 570 may be centered on with centerline 594.

Because idler shaft 332 is able to move slightly in cradle 550 to align with drive shaft 312 along centerline 594, compensation is provided for part manufacturing errors or part tolerance stack-ups of the two shafts 312, 332. With bushing 500 operably coupled with arm 210 of frame 200 and legs 706, 708 of torsion spring 700 attached to frame 200 and/or bushing 500, the torsion spring 700 biases idler shaft 332 to drive shaft 312 along centerline 594. A similar alignment and biasing is achieved using torsion spring 800 and bushing 600 on arm 240 of frame 200. This automatically aligns opposed roll pair 300 to properly feed the media sheet while minimizing paper feed errors such as, for example, skew error. Also, idler shaft 332 is allowed to move into and out of contact with base 552 of cradle 550 while being held by torsion spring 700 along centerline 594. For example, as the media sheet moves through nip 350, the idler shaft 332 moves within cradle 550 radially away from drive shaft 312 along centerline 594 while opposed roll pair 300 rotate. The radial motion also allows different media with varying thickness to be accommodated in nip 350 while avoiding potential media jams.

In FIGS. 4B and 4C, an optional key 534 is shown disposed on rear surface 514 of plate 502. As shown, key 534 radially and circumferentially extends partly around collar rear portion 524 and may be used to secure the engagement of bushing 500 with arm 210 of frame 200. When engaged, arm 210 is sandwiched between key 534 and the rear surface 514 of plate 502. Also, a chamfer 536 is disposed on key 534 at inward radial edges thereof for easily rotating bushing 500 into position in arm 210. When mounting to arm 210, the outer edge of collar rear portion 524 leads in chamfer 536 into arm 210. A chamfer 538 is disposed on the outside of rear portion 524 of collar 520, in particular around its circumferential edge, to further help ease the engagement of bushing 500 with arm 210. Also, for molding purposes one or more radial slots 516 may be formed in key 534.

Figure 8:
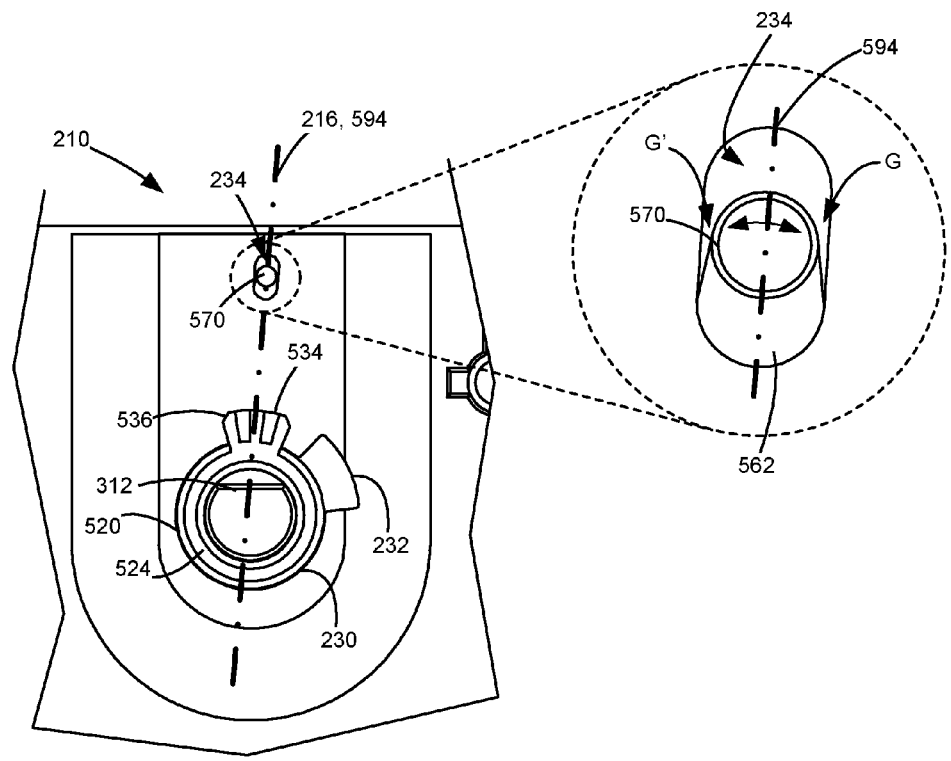
FIG. 8 is a partial rear view of the frame arm of FIG. 6 having a bushing mounted thereon with an inset showing an enlarged view of an opening of the frame arm and a rotational stop of the bushing inserted therein.

When provided, key 534 is sized to pass through a cutaway portion, such as a keyway 232, in arm 210 of frame 200 (see FIG. 8). Key 534 is also spaced apart from rear surface 514 of plate 502 by a gap 518 (see FIG. 4C) which is equal to or slightly greater than a thickness of arm 210 around first opening 230 such that bushing 500 is keyed and locked into first opening 230 when mounting to arm 210. In the embodiment shown in FIG. 4C, crush ribs 532 each have substantially the same length as gap 518. Alternatively, crush ribs 532 may have varying lengths and be an various angles other than those illustrated.

FIG. 5 is a partial side perspective view of arm 210 of frame 200 according to one example embodiment. Arm 210 is made of rigid material for supporting bushing 500 such as plastic or metal. Arm 240 has the same function, material and components and similar structure as that of arm 210, the components of which will now be described in detail.

In FIG. 5, arm 210 includes first and second openings 230, 234 to receive collar 520 and rotational stop 570 of bushing 500, respectively. The two openings 230, 234 have centers that are aligned along a common centerline 216 that is perpendicular to the media path MP. In this example embodiment, first opening 230 is disposed below second opening 234 along common centerline 216. It is understood by one of ordinary skill in the art that the positions of the two openings 230, 234 may vary depending on positions of collar 520 and rotational stop 570 on bushing 500.

As shown in FIG. 5, first opening 230 has a substantially circular shape, such as, for example, a circular through hole, in arm 210 to closely receive collar 520. Second opening 234 is elongated, such as, for example, a slotted through hole in arm 210, so as to allow for adjustment in the position of rotational stop 570 therein. Rotational stop 570 when inserted into second opening 234 fixes and aligns bushing 500 onto arm 210 once collar 520 of bushing 500 has been inserted into first opening 230. It is understood by one of ordinary skill in the art that the shapes of the two openings 230, 234 varies depending on the shapes of collar 520 and rotational stop 570, respectively.

Arm 210 may also include keyway 232 formed about at least a portion of a circumference of first opening 230. Keyway 232 provides sufficient space for receiving key 534 of bushing 500 and allowing key 534 to be locked with arm 210 when bushing 500 is rotated into position. As shown, keyway 232 is sized and/or shaped to receive key 534. Once bushing 500 is engaged with arm 210, the arm 210 is disposed between key 534 and rear surface 514 of plate 502. It is appreciated that the size and shape of keyway 232 may vary accordingly with that of key 534, and vice versa.

Arm 210 includes a pair of opposed mounts formed adjacent to free end 212 and are disposed about the two openings 230, 234. In FIGS. 2 and 5, the pair of mounts includes slots 218, 220 formed in arm 210 and having latching surfaces 222, 224, respectively. In this example embodiment, latching surfaces 222, 224 are formed at respective topmost sections of slots 218, 220. Catches 712 of legs 706, 708 of torsion spring 700 enter respective slots 218, 220 and engage with latching surfaces 222, 224, respectively o (see FIG. 7). In FIG. 5, another example embodiment of the opposed mounts is shown as a pair of opposed posts 226, 228 depending from arm 210. Posts 226, 228 are shown at substantially same positions as latching surfaces 222, 224 of slots 218, 220, respectively, in the previous mount embodiment. In this example embodiment, posts 226, 228 provide mount/latching means for catches 712 of legs 706, 708 of torsion spring 700, respectively or for legs 706, 708. In another example embodiment and as later described in detail, these mounts may be disposed on bushing 500. It is further appreciated that posts 226, 228 may be made of substantially the same material as arm 210 or bushing 500 or may be formed from another material.

FIGS. 6A-6B are perspective views of torsion spring 700 according to two example embodiments. In the embodiment shown in FIG. 6A, each leg 706, 708 of torsion spring 700 includes catch 712 at their respective distal end which will engage with a corresponding mount provided in one of arm 210 and bushing 500, for example. Legs 706, 708 extend from opposites ends of coiled body 702 along the same tangent line 709 and, as shown, are substantially straight but leg 706 is bent at a position between catch 712 thereof and body 702. In particular, leg 706 includes an offset 714 in at least a portion of leg 706 and/or at substantially the same length as leg 708. Offset 714 and adjacent portions of leg 706 form a substantially Z-shape and may be used to accommodate a projection occurring on arm 210. It is appreciated that offset 714 may bend to form any shape with the adjacent portions of leg 706 so the shape illustrated should not be construed to be a limitation. In this example embodiment, legs 706, 708 of torsion spring 700 are of unequal length for mounting to arm 210. In another example embodiment shown in FIG. 6B, legs 708, 716 of a torsion spring 700-1 are of substantially equal length. Legs 708, 716 are straight as both extend from opposite ends of coiled body 702 along tangent line 709. In this example embodiment, leg 716 includes catch 712 which will be engaged with the mount provided in one of arm 210 and bushing 500. It will be appreciated that arm 210 or bushing 500 is modified accordingly to accept legs 708, 716 of torsion spring 700-1.

Figure 7:
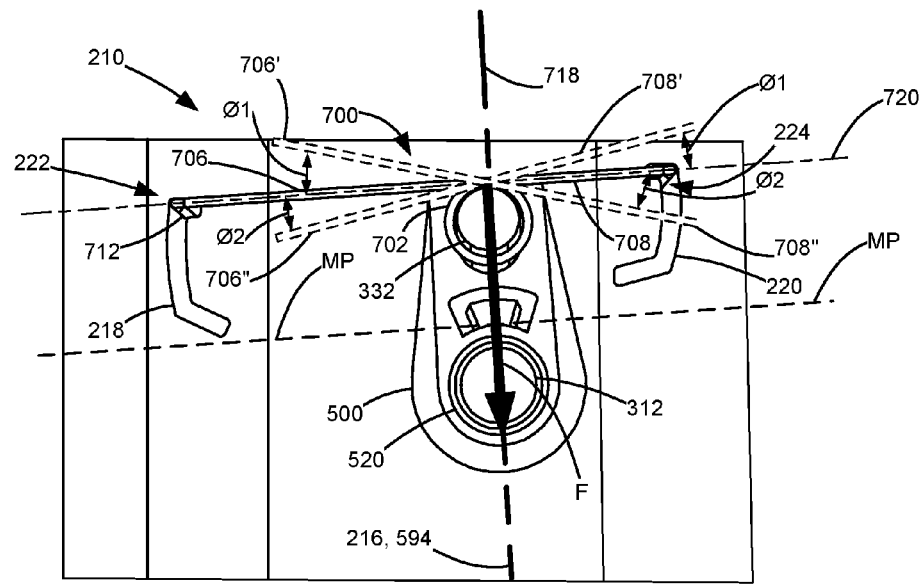
FIG. 7 is an illustrative side view of a frame arm having mounted thereon a bushing and torsion spring of the alignment assembly of FIG. 2 according to one example embodiment.

FIG. 7 illustrates the application of the biasing force applied to idler shaft 332. As shown with the legs 706, 708 of torsion spring 700 engaged with latch surfaces 222, 224 of mounts 218, 220 and body 702 mounted on idler shaft 332, a biasing force vector F is applied along a common centerline 718 formed when centerlines 216 and 594 are coincident due to the mounting of shafts 312, 332 in bushing 500 and on arm 210. As shown legs 706, 708 extend in a tangent plane 720 that is positioned to be parallel to the media path MP. This results in a low profile/minimal space arrangement for torsion spring 700. In other words, there is minimal space for torsion springs 700, 800 since there is no need to position its coils 704, 804 alongside or above idler shaft 312 in media feed roll assembly 100. Because media path MP is at a slight rising angle, as viewed from left to right in the figure, mount 220 (slot 220 in the figure) is raised slightly at a similar angle on arm 210 than mount 218 (slot 218 in the figure). When media path MP is horizontal, both mounts 218 and 220 would be positioned at substantially the same height on arm 210.

Alternate positions for legs 706, 708 are also shown. Legs 706, 708 may both be positioned either above tangent plane 720 as shown at 706', 708' by an angle Ø1 or be positioned below tangent plane 720 as shown at 706", 708" by an angle Ø2. The mounts It will be appreciated that if one leg was above and the other below tangent plane 720 the direction of force vector F would move away from common centerline 718. Angles Ø1 and Ø2 may be in the range of about 0 degrees to about 1.33 degrees with respect to tangent plane 720, thereby providing a substantially planar profile 720. Mounts 218, 220 would be moved to corresponding to the alternate leg positions.

Torsion spring 700 applies biasing force F onto idler shaft 332 to move idler shaft 332 along common centerline 718 toward drive shaft 312, thereby moving idler roll 330 into axial contact with driven roll 310. In one example form, torsion springs 700, 800 may each provide a biasing force F in a range of about 4.5 N to about 5.5 N. In one example form, torsion spring 700 has a rotational spring rate between about 0.18 N·mm/degree and about 0.22 N·mm/degree. In another example embodiment, a range of rotation between each leg 706, 708 of torsion spring 700 from an unloaded state to a loaded state that occurs at the tangent plane is about 51 degrees to about 180 degrees. It is appreciated that torsion spring 800 forms a similar substantially planar profile and has similar characteristics as torsion spring 700.

FIG. 8 is a partial rear view of arm 210 with bushing 500 and driven shaft 312 mounted in collar 520 according to one example embodiment illustrating in the inset the relationship between rotational stop 570 and second opening 234. As can be seen in the inset, the width of rotational stop 570 is less than the width of second opening 234 forming a small gap G, G' on either side of rotational stop 570. With this arrangement, a limited amount of rotational positioning of bushing 500 may take place during mounting of bushing 500 on arm 210. For example, the gaps G, G' between rotational stop 570 and the side walls of second opening 234 may total approximately 0.2 mm (or 0.1 mm either side when centered). Using a diameter tolerance of the rotational stop 570 of about ±0.05 mm and a position of the gap tolerance of about ±0.05 mm results in a worst case angle stack up of about ±0.54 degrees between bushing 500 and arm 210. Other gaps lengths may be used. As collar rear portion 524 of bushing 500 is rotated to position in first opening 230, rotational stop 570 snaps into second opening 234, thereby stopping further rotation movement of bushing 500 with respect to arm 210. At the same time, key 534 and plate 502 are engaged with arm 210 securing bushing 500 onto arm 210 and aligning its centerline 594 with centerline 216 of arm 210 (see FIGS. 5 and 7-8) without the need for additional fasteners and decreasing assembly time. Also, when drive shaft 312 rotates, bushing 500 does not rotate therewith. With bushing 500 mounted on arm 210, centerlines 216, 594 are coincident and form common centerline 718 (see FIG. 7). It is appreciated that bushing 600 is mounted to arm 240 in the same manner bushing 500 is mounted to arm 210, forming same common centerline thereat.

FIG. 9 is a partial cross sectional view taken along line 9-9 of FIG. 2 illustrating mounting of bushing 500 and drive and idler shafts 312, 332 to arm 210 according to one example embodiment. In this example embodiment, drive shaft 312 and idler shaft 332 have outer diameters D2 and D4, respectively. As shown, axial opening 521 of collar 520 has at least a portion axially extending from front surface 512 of plate 502. The axial opening 521 includes the entry portion 526 having a diameter D3 and chamfer 528 and the bearing portion 530 having a diameter D1 and chamfer 528. It is appreciated that the diameter D3 of entry portion 526 is greater than the diameter D1 of bearing portion 530 and the difference therebetween is a matter of design choice and may be chosen to be about zero. It is also appreciated that outer diameter D2 of idler shaft 332 is slightly less than diameter D1 of bearing portion 530 so bearing portion close receives and rotatably supports drive shaft 312 therein. Drive shaft 312 includes one or more slots 322 such that drive shaft 312 is rotatably fixed to bushing 500 via fasteners 323, such as but not limited to e-clips 323, to limit the axial movement of bushing 500 along rotational axes 580, 590 (see FIG. 4A). It is understood by one of ordinary skill in the art that drive shaft 312 may be fastened in the same manner at bushing 600.

The body 702 of torsion spring 700 is slid over idler shaft 332. Coils 704 are wrapped around idler shaft 332 and positioned adjacent to arm 210 when mounted. It is appreciated that torsion spring 800 is mounted and designed in substantially the same manner as torsion spring 700. Body 702 of torsion spring 700 has an inner diameter D5 that is slightly greater than the diameter D4 of idler shaft 332. As is known, as torsion spring 700 is loaded, the inner diameter D5 of coiled body 702 will decrease. At a predetermined maximum loading, the inner diameter D5 will be at its minimum. For the assembly shown in FIG. 2, the minimum inner diameter D5 will occur when legs 706, 708 are bent to be inserted into slots 218, 222. Torsion spring 700 is designed so that at the predetermined maximum loading of torsion spring 700, the inner diameter D5 will never be less than diameter D4 of idler shaft 332. Should inner diameter D5 become less than diameter D4, torsion spring 700 may be damaged due to excessive stress. Accordingly, diameter D5 is sized so that when torsion spring 700 is at the maximum loading, the clearance between coiled body 702 and the portion of idler shaft 332 where it is positioned will be at least 0.1 mm. With this design the height of torsion spring 700 above idler shaft 332 will be approximately the thickness t of the wire used to make coils 704 of torsion spring 700.

It is appreciated that part-to-part, such as for example the thickness t, tolerances of torsion spring 700 may be greater compared to the springs in previously discussed prior art designs without adversely impacting the spring rate of torsion spring 700. In particular, effects of part-to-part manufacturing variation of spring rate among different torsion springs is small as compared to the part-to-part variation of leaf springs used in the prior art designs. Further with the present arrangement, torsion springs 700, 800 cannot be accidentally ejected from media feed roll assembly 100 as could occur with the prior art torsion and leaf spring designs. In particular, torsion springs 700, 800 would need to be disengaged from their respective mounts, releasing their torsional load before idler shaft 332 could be removed. Furthermore, during installation of torsion springs 700, 800 with their corresponding mounts, torsion springs 700, 800 are prevented from falling or flying off during tensioning due to being mounted on idler shaft 312 prior to their engagement with their respective mounts.

Figure 10A:
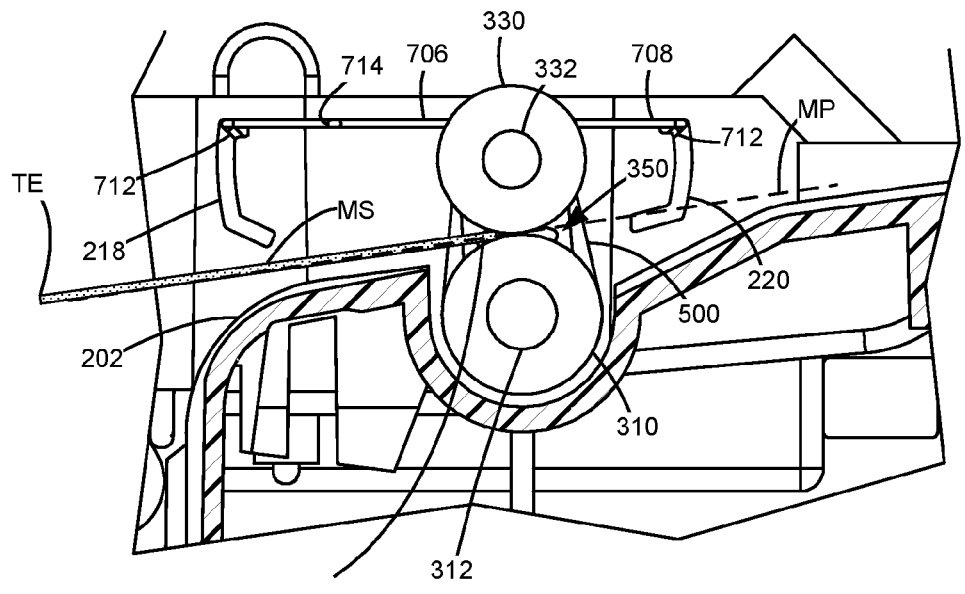
FIGS. 10A and 10B are partial cross sectional views the media feed roll assembly of FIG. 2 having a media sheet entering therein.
Figure 10B:
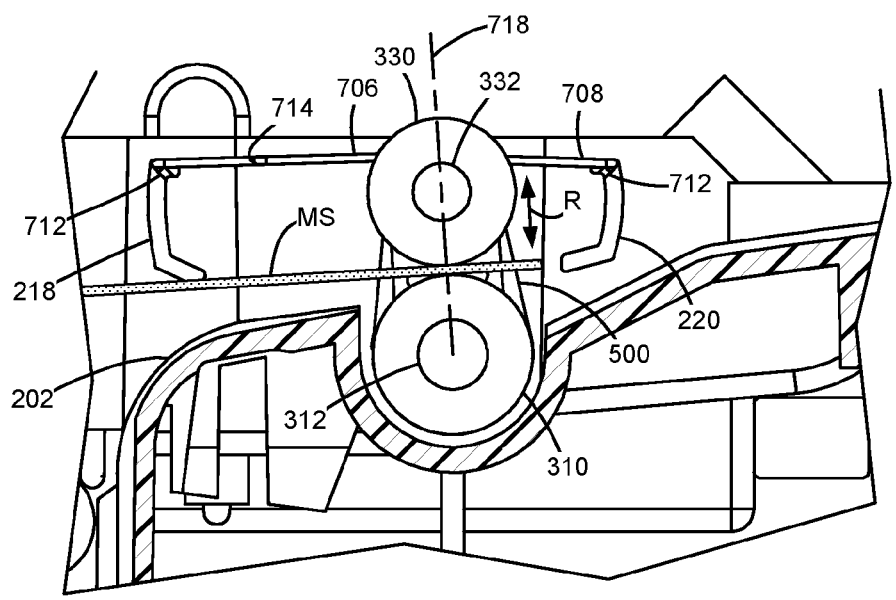

Referring to FIGS. 2-3, 7, and 10A-10B, feeding of a media sheet MS along media path MP in the MFD using media feed roll assembly 100 will be described. As shown in FIG. 10B, idler roll 330 is moveable toward and away from driven roll 310 in a radial direction R along common centerline 718.

Before media sheet MS enters nip 350, the two shafts 312, 332 are axially aligned with each other due to auto-alignment of idler shaft 332 in cradles 550, 650 of bushings 500, 600, respectively, along nip 350 (see FIG. 10A). Each leg 706, 708 of torsion spring 700 form substantially planar profile 720 and provide the biasing force F as previously described. When a leading edge LE of media sheet MS strikes idler roll 330 along nip 350, idler shaft 332 begins to radially move within cradles 550, 650 of bushings 500, 600 away from drive shaft 312 along common centerline 718 (see FIG. 10B). As media sheet MS moves through nip 350 along media path MP, idler shaft 332 continues to move within cradles 550, 650 of bushings 500, 600 radially away (upward pointing arrow along radial direction R) from drive shaft 312 along common centerline 718 in FIG. 10B. At the same time idler shaft 332 moves in the radial direction R perpendicular to media path MP, the legs 706, 708 of torsion spring 700 flex slightly in a direction similar to that shown by legs 706", 708" in FIG. 7 increasing the biasing force F slightly.

When a trailing edge TE of media sheet MS disengages from the two rolls 310, 330 and leaves nip 350, the two shafts 312, 332 return to their original positions (FIG. 10A) and are aligned with each other, ready to receive and feed a succeeding media sheet. In these example embodiments shown, the biasing force F remains substantially perpendicular to common centerline 718 even during media passages through nip 350 as shown in FIG. 10B. Also, when the media sheet MS passes through nip 350, the media moves through media path MP substantially perpendicular to the common centerline 718 (FIG. 10B).

Figure 11A:
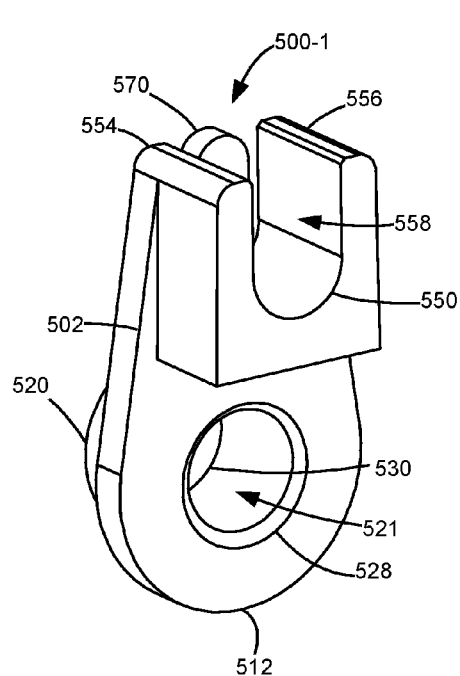
FIGS. 11A and 11B are front and rear perspective views of a bushing according to one example embodiment.
Figure 11B:
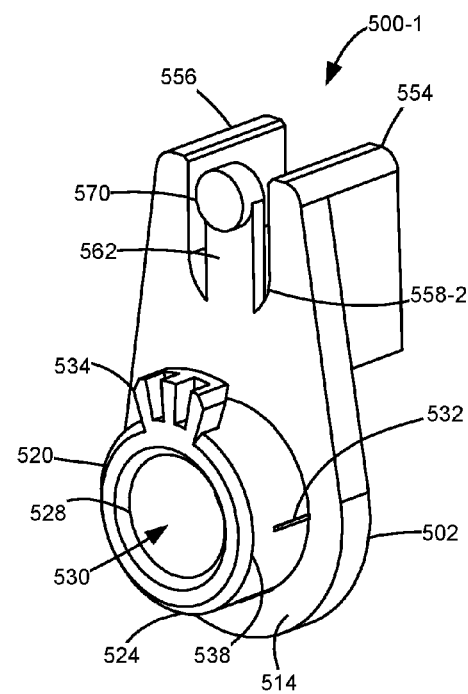

Various alternate forms of bushings 500, 600 will now be described. Again only bushing 500 will be discussed with any variations in bushing 600 being noted. FIGS. 11A-11B are front and rear perspective views of bushing 500-1 according to one example embodiment. As shown, bushing 500-1 has collar 520 axially extending only from the rear surface 514 of plate 502 and cradle 550 axially extending from front surface 512. Entry portion 526 of axial opening 521 is provided in plate 502 having chamfer 528. Collar 520 consists of rear portion 524 having bearing portion 530 of axial opening 521. Key 534 is provided on rear portion 524 as previously described. Chamfers 528, 538 may again be provided about the end of axial opening 521 and the outer circumference of rear portion 524, respectively. Crush ribs 532, latching arm 562 and rotational stop 570 are also provided as previously described.

Figure 12A:
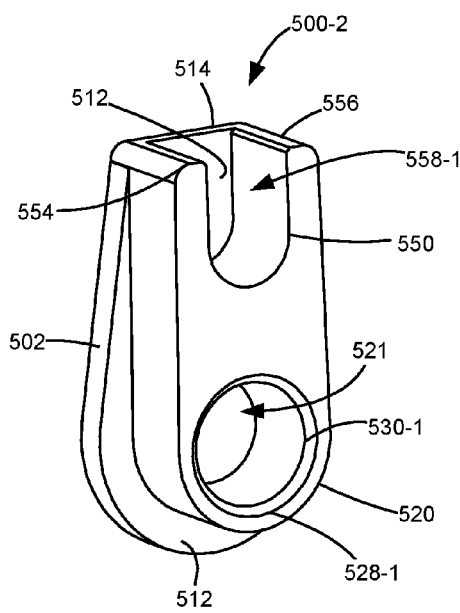
FIGS. 12A and 12B are front and rear perspective views of a bushing according to another example embodiment.
Figure 12B:
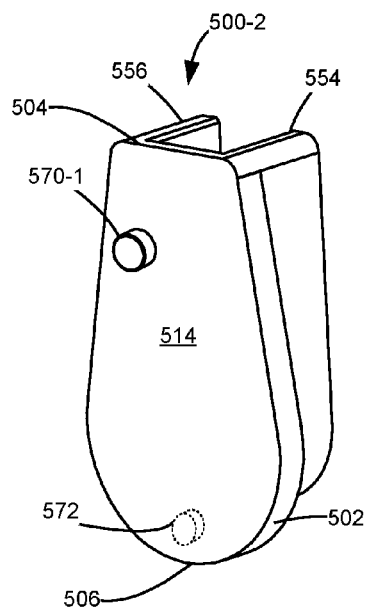

FIGS. 12A-12B are front and rear perspective views of another example embodiment of the bushing. As shown, bushing 500-2 includes plate 502, collar 520 and cradle 550 that both axially extend from front surface 512 of plate 502. Cradle 550 again has opposed arms 554, 556 forming slot 558-1. Slot 558-1 of cradle 550 is closed at one end by plate 512. The axial opening 521 of collar 520 includes bearing portion 530-1 now axially extending from front surface 512. Collar 520 also includes a front chamfer 528-1 to ease the insertion of drive shaft 312 into axial opening 521. In this embodiment, drive shaft 312 does not extend through bushing 500-2 so suitable drive means for drive shaft 312 would be mounted inboard of bushing 500-2 on drive shaft 312 or bushing 500-2 would be paired with a bushing similar to bushings 500 or 500-1, for example, where drive shaft passes through. A rotational stop 570-1 is disposed on rear surface 514 near top 504 of plate 502. In particular, rotational stop 570-1 axially extends from rear surface 514 of plate 502 but is shown offset from a position between adjacent arms 554, 556 of cradle 550. Second opening 234 in arm 210 would be correspondingly moved. Rotational stop 570-1 engages with second opening 234 provided in arm 210 to restrict the rotation of mounted bushing 500-2. Optionally, a mount 572, such as but not limited to a post 572, may be disposed on rear surface 514 and near bottom 506 of plate 502. This provides mounting features similar to that of rear portion 524 of collar 520 in previous bushing embodiments to engage with a corresponding opening provided in arm 210.

FIGS. 13A-13B are front and rear perspective views of another example embodiment of the bushing. As shown, bushing 500-3 includes plate 502, and collar 520 and cradle 550 that both axially extend from front surface 512 of plate 502. Arms 554, 556, and base 552 form slot 558 in cradle 550. The axial opening 521 of collar 520 includes bearing portion 530-2 axially extending from front surface 512 through rear surface 514. Collar 520 also includes a chamfer 528-1 to ease the insertion of drive shaft 312 into axial opening 521 and through bushing 500-3. Plate 502 includes a through hole 574 for mounting bushing 500-3 onto arm 210 of frame 200 using suitable mounting means 576 such as, for example, fastener 576. Latching arm 562 and rotational stop 570 at its distal end 564 are also provided as previously described.

FIGS. 14 and 15 are front perspective views of bushing 500 now having an extended plate 502-1 showing two forms of spring attachment. The spring attachments provide substantially same features as slots 218, 220, latching surfaces 222, 224 therein and posts 226, 228 in arm 210. As shown, bushings 500-4, 500-5 each includes extended plate 502-1, a collar 520 and cradle 550 that both axially extend from at least a front surface 512 of extended plate 502-1. Latching arm 562 and rotational stop 570 are provided as previously described.

Plate 502-1 includes a pair of mounts 565 disposed adjacent to each of arms 554, 556 of cradle 550. In the example embodiment of FIG. 14, bushing 500-4 has a pair of mounts 565 in the form of slots 566 and 568 having latching surfaces 577 and 579 therein, respectively. Slots 566, 568 may be formed in plate 502-1 or may be formed in standoffs or bosses 586 provided on front surface 512. The slots 566, 568 and latching surfaces 577, 579 are disposed in a similar manner to provide the same functionality as respective slots 218, 220 and latching surfaces 222, 224 in frame arm 210 (see FIG. 5). In the other example embodiment of FIG. 15, bushing 500-5 has the pair of mounts 565 in the form of posts 567, 569 that extend outwardly from front surface 512 to engage with, for example, legs 706, 712 of torsion spring 700-1 with their equal length corresponding to the distance between posts 567, 569 and the vertical centerline of bushing 500-5 along which body 702 of torsion spring 700-1 would be centered. Posts 567, 569 provide the same function as posts 226, 224 in arm 210 in FIG. 5.

As can be appreciated by the variations available in bushing, the size and configuration of plate 502 should not be construed to be a limitation and should be considered as a matter of design choice. The foregoing embodiments provide a low profile, torsion spring biased alignment assembly for media feed rolls for use in an imaging device.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

What is claimed is:

1. An alignment assembly mountable in a frame for axially aligning and rotatably holding a first shaft and a second shaft forming a nip therebetween for feeding a media sheet, the first shaft coupleable to a drive source, the alignment assembly comprising:
  a first and a second bushing mountable to the frame in a spaced relationship, the first and second bushings each having a circular collar and a cradle positioned along a common centerline for rotatably holding respective centers of the first and the second shafts on the common centerline, the collars of the first and second bushings receiving the first shaft and the cradles of the first and second bushings receiving the second shaft; and
  a first and a second torsion spring mountable around the second shaft adjacent to the first and second bushing, respectively, the first and second torsion springs each having a pair of legs extending therefrom and attachable to one of the frame and the respective bushing;
  wherein, with the first and second bushings attached to the frame and the pairs of legs of the first and second torsion springs attached to one of the frame and respective bushings, the pair of legs of the first and second torsion springs forming a substantially planar profile for biasing the second shaft toward the first shaft along the common centerline while allowing the second shaft to move within the cradles radially away from the first shaft along the common centerline as the media sheet moves through the nip.

2. The alignment assembly of claim 1, wherein each collar has a stepped axial opening therein, the stepped axial opening including a bearing portion having a first diameter sized to closely receive and rotatably support the first shaft and an entry portion having a second diameter greater than the first diameter.

3. The alignment assembly of claim 1, wherein the first and second bushings each comprise a plate having a front and a rear surface, the collar and the cradle extending from the front surface of the plate, and a rotational stop disposed on the rear surface and centered on the respective common centerline and, when the first and second bushings are mounted to the frame, received in a corresponding opening in the frame.

4. The alignment assembly of claim 1, wherein the first and second torsion springs each has a range of rotation between each leg from a free to a loaded state of about −51 degrees to about 180 degrees, respectively, with respect to the substantially planar profile.

5. The alignment assembly of claim 1, wherein the first and second torsion springs each has an angular tolerance between each leg of about 1.33 degrees with respect to the substantially planar profile.

6. The alignment assembly of claim 1, wherein with each leg of the first and second torsion springs attached to one of the frame and the respective bushing, each torsion spring provides a force vector to the second shaft in a direction aligned with the respective common centerline.

7. The alignment assembly of claim 6, wherein the first and second torsion springs each has a rotational spring rate between about 0.18 N·mm/degree and about 0.22 N·mm/degree.

8. The alignment assembly of claim 6, wherein the first and second torsion springs each provides a biasing force in the range of about 4.5 N to about 5.5 N.

9. The alignment assembly of claim 1, wherein each pair of legs includes a first and a second catch attachable to a corresponding latching surface provided in a corresponding first mount and a second mount, the first and second mounts positioned about the cradles of the first and second bushings and provided in one of the frame and the respective bushing, and, with the first and second catches engaged with the corresponding latching surfaces, the pair of legs form the substantially planar profile.

10. A media feed roll assembly mountable in an imaging device, the media feed roll assembly comprising:
  a first shaft coupleable to a drive source;
  a second shaft, the first shaft and the second shaft forming a nip therebetween for feeding a media sheet;
  a frame;
  a first and a second bushing mounted to the frame in a spaced relationship for rotatably holding and axially aligning the first and second shafts along a first common centerline, the first and second bushing each including a plate having a cylindrical collar and a cradle disposed on a front surface of the plate and aligned along the first common centerline for rotatably holding the first and second shafts, respectively, each collar and cradle respectively sized to closely receive and rotatably support a respective portion of the first and second shafts therein with each cradle allowing the second shaft to radially move therein while maintaining the axial alignment between the first and second shafts on the first common centerline; and
  a first and a second torsion spring axially spaced along the second shaft adjacent to the respective first and second bushings, the first and second torsion springs each having a coiled body with a pair of legs extending therefrom, the pair of legs attached to one of the frame and the respective bushing plate with the second shaft passing through the coiled body of each of the first and second torsion springs,
  wherein with the pairs of legs of the first and second torsion springs attached, each pair of legs forms a substantially planar profile and applies a biasing force to the second shaft to move the second shaft toward and into axial contact with the first shaft along the first common centerline, and further wherein, as the media sheet moves through the nip, the second shaft moves within the cradles radially away from the first shaft along the first common centerline.

11. The media feed roll assembly of claim 10, wherein each collar has a stepped axial opening therein, the stepped axial opening including a bearing portion having a first diameter sized to closely receive the first shaft and rotatably support the first shaft and an entry having a second diameter greater than the first diameter.

12. The media feed roll assembly of claim 10, wherein the frame includes a first pair of axially aligned openings and each collar includes a rear portion extending from a rear surface of the bushing plate, each collar having a plurality of radially extending crush ribs spaced around an outer periphery of the rear portion, wherein, the insertion of the rear portions into a respective opening in the first pair of axially aligned openings crushes the crush ribs.

13. The media feed roll assembly of claim 10, wherein the frame includes a second pair of axially aligned openings in the frame and disposed adjacent to the respective bushing plates, and wherein the first and second bushings each include a rotational stop disposed on a rear surface of the bushing plate and centered with the first common centerline, each rotational stop received in a corresponding opening of the second pair of axially aligned openings.

14. The media feed roll assembly of claim 10, wherein the frame includes a pair of opposed arms each arm having a pair of openings therein positioned along a second common centerline, a corresponding one opening of each pair of openings having a keyway, and further wherein each collar comprises a rear portion extending through a rear surface of the bushing plate, each rear portion having a radial flange spaced apart at a distance from the rear surface of the bushing plate and sized to pass through the keyway, wherein, with each rear portion inserted through the corresponding one opening having the keyway, the corresponding arm of the frame is sandwiched between the radial flange and the rear surface of the bushing plate to prevent axial movement of the bushing when the bushing is rotated so that the first and second common centerlines are aligned with one another.

15. The media feed roll assembly of claim 10, wherein each pair of legs includes a first and a second catch attachable to corresponding latching surfaces provided in a corresponding first mount and a second mount, the first and second mounts positioned about each of the cradles of the first and second bushings and provided in one of the frame and the respective bushing plates.

16. The media feed roll assembly of claim 10, wherein each coiled body has an inner diameter at a predetermined maximum loading that provides a clearance of about 0.1 mm between the inner diameter of each coiled body and an outer diameter of the second shaft where each of the coiled bodies is positioned.

17. A media feed roll assembly for feeding a media sheet, the media feed roll assembly comprising:
 a first shaft coupleable to a drive source;
 a second shaft, the first shaft and the second shaft forming a nip therebetween for feeding the media sheet;
 a frame including a first arm and an opposed second arm, each of the first and second arms including a first opening therein and a second opening aligned with the first opening along a first centerline, the first and second arms having a pair of opposed mounts positioned above the first opening, each mount having a latching surface;
 a first and a second bushing mounted to the first and second arms, respectively, the first and second bushings each comprising:
  a plate;
  a cylindrical collar having a front portion and a rear portion axially extending from a front and a rear surface of the plate, respectively, the rear portion of the collar sized to be closely received in a corresponding first opening of the respective arm of the frame, at least the front portion of the collar having an axial opening therein;
  a cradle disposed above the collar and axially extending from the front surface of the plate;
  the collar and corresponding cradle centered along a second centerline and rotatably holding the first and second shafts, respectively, along the second centerline; and
  a rotational stop axially extending from the rear surface of the plate and centered along the second centerline, the rotational stop sized to be closely received in a corresponding second opening of the respective arm of the frame;
  wherein with the rear portion of the collar received in the respective first opening and the corresponding rotational stop received in the respective second opening, the first and second centerlines are coincident and form a common centerline; and
 a first and a second torsion spring axially spaced on the second shaft adjacent to the first and second bushings, respectively, the first and second torsion springs each having a coiled body having a pair of legs extending therefrom, the second shaft passing through each coiled body, each leg having a catch engaged with the corresponding latching surface of the mount forming a substantially planar profile and biasing the second shaft along the common centerline toward and into axial contact with the first shaft,
 wherein, as the media sheet moves through the nip, the second shaft moves within the cradles of the first and second bushings radially away from the first shaft along the common centerline.

18. The media feed roll assembly of claim 17, wherein each collar comprises a plurality of radially extending crush ribs spaced around an outer periphery of the rear portion of the collar.

19. The media feed roll assembly of claim 17, wherein each first opening of the frame has a keyway radially displaced from the first centerline and the rear portion of each collar has a corresponding radial flange sized to pass through the keyway, the flange spaced apart at a distance from the rear surface of the plate such that the corresponding arm is sandwiched between the flange and the rear surface of the plate, thereby preventing axial movement of the first and second bushings when attached to the corresponding first and second arms of the frame.

20. The media feed roll assembly of claim 17, wherein each rotational stop provides a rotational tolerance of about 0.2 mm between each rotational stop and the corresponding second opening in each frame arm.

21. The media feed roll assembly of claim 17, wherein the coiled bodies of the first and second torsion springs each have an inner diameter at a predetermined maximum loading that provides a clearance of about 0.1 mm between the inner diameter of each coiled body and an outer diameter of the second shaft where each of the coiled bodies is positioned.

* * * * *